(12) United States Patent
Ohi et al.

(10) Patent No.: US 10,518,748 B2
(45) Date of Patent: Dec. 31, 2019

(54) ELECTRONIC KEY SYSTEM

(71) Applicant: Mazda Motor Corporation, Aki-gun, Hiroshima (JP)

(72) Inventors: Yasuhiro Ohi, Hiroshima (JP); Yoshitaka Kimura, Hiroshima (JP); Shotaro Hirosue, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/083,979

(22) PCT Filed: Oct. 11, 2017

(86) PCT No.: PCT/JP2017/036756
§ 371 (c)(1),
(2) Date: Sep. 11, 2018

(87) PCT Pub. No.: WO2018/070402
PCT Pub. Date: Apr. 19, 2018

(65) Prior Publication Data
US 2019/0256046 A1   Aug. 22, 2019

(30) Foreign Application Priority Data
Oct. 12, 2016   (JP) .................................. 2016-200986

(51) Int. Cl.
B60R 25/24   (2013.01)

(52) U.S. Cl.
CPC .............. B60R 25/24 (2013.01); *E05B 81/77* (2013.01)

(58) Field of Classification Search
CPC ....... B60R 25/24; B60R 25/246; E05B 81/77; G07C 2009/00388; G07C 2009/00428; G07C 2009/00555

(Continued)

(56) References Cited

U.S. PATENT DOCUMENTS 6,496,100 B1 * 12/2002 Hiebl .................... B60R 25/24
                                                    307/10.3
6,542,071 B1 *  4/2003 Ohtsubo ............. B60R 25/2036
                                                    340/10.1

(Continued)

FOREIGN PATENT DOCUMENTS

JP   2004169316 A   6/2004
JP   2007040008 A   2/2007

(Continued)

OTHER PUBLICATIONS

Japanese Patent Office, Japanese Office Action Issued in Japanese Patent Application No. 2016-200986, dated Nov. 6, 201, 8 pages. (Submitted with Machine Translation).

*Primary Examiner* — Edwin C Holloway, III
(74) *Attorney, Agent, or Firm* — Alleman Hall Creasman & Tuttle LLP

(57) ABSTRACT

An electronic key system comprises a vehicle-mounted device and a plurality of electronic keys and is configured to have: a normal mode in which given processing is permitted to be executed by the vehicle-mounted device when given wireless communication processing between the vehicle-mounted device and the electronic key is successfully completed; and a deactivated mode in which the given processing is inhibited from being executed by the vehicle-mounted device, wherein when the electronic key in the deactivated mode transmits, at a given time, a given signal containing deactivated mode information indicating that the electronic key is operating in the deactivated mode, and the electronic key in the normal mode is shifted to the deactivated mode in response to receiving of the signal containing the deactivated mode information.

6 Claims, 5 Drawing Sheets

(58) Field of Classification Search
USPC ......... 340/5.31, 5.64, 5.61, 5.62, 5.63, 4.34, 340/12.27, 426.36
See application file for complete search history.

(56) References Cited

U.S. PATENT DOCUMENTS

| | | | | |
|---|---|---|---|---|
| 2003/0222757 A1* | 12/2003 | Ghabra | ................... | B60R 25/24 |
| | | | | 340/5.72 |
| 2004/0150512 A1 | 8/2004 | Yoshikawa | | |
| 2006/0186988 A1* | 8/2006 | Proefke | ................... | B60R 25/24 |
| | | | | 340/5.61 |
| 2006/0255908 A1* | 11/2006 | Gilbert | ................... | B60R 25/24 |
| | | | | 340/5.61 |
| 2009/0015387 A1* | 1/2009 | Hayama | ................... | B60R 25/04 |
| | | | | 340/426.3 |
| 2009/0284345 A1* | 11/2009 | Ghabra | ................... | B60R 25/24 |
| | | | | 340/5.61 |
| 2015/0070135 A1* | 3/2015 | Ford | ................... | B60R 25/24 |
| | | | | 340/5.72 |
| 2018/0222444 A1* | 8/2018 | Nishiyama | .............. | B60R 25/24 |

FOREIGN PATENT DOCUMENTS

| JP | 2009107530 A | 5/2009 |
|---|---|---|
| JP | 2012255311 A | 12/2012 |
| JP | 2013119757 A | 6/2013 |
| JP | 2015055107 A | 3/2015 |
| JP | 2016079600 A | 5/2016 |

\* cited by examiner

ELECTRONIC KEY SYSTEM

TECHNICAL FIELD

The present invention relates to an electronic key system, and more particularly to an electronic key system in which a given operation is executed in a vehicle in response to an action of a user who carries an electronic key.

BACKGROUND ART

Heretofore, a vehicle having a smart (advanced) keyless function has been known. This type of vehicle is configured such that a user who carries an electronic key can cause a desired processing to be executed in the vehicle, simply by perform a given manipulation. For example, through the use of the smart keyless function, the user can automatically unlock a door of a vehicle simply by touching a sensor provided on a door knob (or by pushing a switch provided on the door) and then automatically lock the door simply by manipulating a manipulation section provided on the vehicle when closing the door, and can start an engine simply by pushing an engine switch.

In order to fulfill such a smart keyless function, a vehicle-mounted device mounted to the vehicle and an electronic key carried by a user are configured to be triggered by each of the above manipulations to execute a given communication processing therebetween. Then, if this communication processing (i.e., authentication) is successfully completed, a given processing will be executed in the vehicle.

Typically, in the communication processing, a first communicable distance of the electronic key with respect to the vehicle-mounted device is relatively long (e.g., several tens of meters or more), whereas a second communicable distance of the vehicle-mounted device with respect to the electronic key is relatively short (e.g., about 1 m). Therefore, the smart keyless function can be effectively enabled when a user who carries the electronic key is located around or inside the vehicle. That is, in a situation where the user (i.e., the electronic key) is located at a position away from the vehicle by a distance greater than the second communicable distance which is about 1 m, the door of the vehicle is not unlocked, for example, even if a third party touches the sensor of the door knob.

However, in recent years, the presence of a new modus operandi for vehicle theft, called "relay attack," has been revealed. This modus operandi comprises amplifying a communication radio wave by a relay (repeater) so that the communication processing can be successfully completed between the electronic key and the vehicle-mounted device even when they are far apart from each other, thereby enabling the smart keyless function. With a view to preventing vehicle theft using the relay attack, there has been proposed, as a countermeasure against the relay attack, a technique of deactivating the smart keyless function based on a user's own will (See, for example, Patent Document 1). In the technique described in Patent Document 1, the user can temporarily deactivate the smart keyless function, for example, by performing a specific deactivation manipulation, using the electronic key.

CITATION LIST

Parent Document

Patent Document 1: JP 2016-79600A

SUMMARY OF INVENTION

Technical Problem

However, in the technique described in the Patent Document 1, in a situation where there are a plurality of electronic keys for one vehicle, even if the smart keyless function is temporarily deactivated by using a certain one of the electronic keys to cope with the relay attack, this countermeasure is likely to fail to effectively work for the remaining electronic keys.

The present invention has been made in order to solve such a problem, and an object thereof is to provide an electronic key system capable of allowing a relay attack countermeasure to reliably work even in a situation where there are a plurality of electronic keys for one vehicle.

Solution to Technical Problem

In order to achieve the above object, the present invention provides an electronic key system comprising: a vehicle-mounted device mounted to a vehicle; and a plurality of electronic keys each wirelessly communicable with the vehicle-mounted device, the electronic key system being configured to have: a normal mode in which a given processing is permitted to be executed by the vehicle-mounted device when a given wireless communication processing between the vehicle-mounted device and any one of the plurality of electronic keys is successfully completed; and a deactivated mode in which the given processing is inhibited from being executed by the vehicle-mounted device, wherein the electronic key is configured, when operating in the deactivated mode, to transmit, at a given time, a signal containing deactivated mode information indicating that the electronic key is operating in the deactivated mode, and the electronic key is configured, when operating in the normal mode, to be shifted to the deactivated mode in response to receiving of the signal containing the deactivated mode information.

According to the present invention, as an operation mode, the electronic key system has the normal mode in which a smart keyless function is permitted to be executed, and the deactivated mode in which the smart keyless function is deactivated. When one of the plurality of electronic keys is operating in the deactivated mode, the specific electronic key transmits the signal containing the deactivated mode information, at a given time. Then, the other electronic keys receiving the deactivated mode information directly or indirectly can be shifted to the deactivated mode. As above, in the electronic key system of the present invention, upon shifting any one of the plurality of electronic keys to the deactivated mode, the remaining electronic key(s) can also be shifted to the deactivated mode. Thus, it becomes possible to allow a relay attack countermeasure to automatically effectively work for the remaining electronic key(s), as well as the one specific electronic key.

Preferably, in the electronic key system of the present invention, at least one of the plurality of electronic keys comprises a mode shift manipulation section for causing a shift from the normal mode to the deactivated mode, wherein the at least one electronic key is configured to be shifted to the deactivated mode and to transmit the signal containing the deactivated mode information, in response to manipulation of the mode shift manipulation section.

According to this feature, by manipulating the mode shift manipulation section of the at least one electronic key, a user can shift the at least one electronic key to the deactivated mode, based on the user's own will. Further, according to the present invention, the signal containing the deactivated mode information is transmitted from any one of the electronic keys, in response to manipulation of the mode shift manipulation section of the electronic key. This makes it possible to shift the remaining electronic key(s) to the deactivated mode at the same timing.

Preferably, in the electronic key system of the present invention, the electronic key is configured, in the deactivated mode, to transmit the signal containing the deactivated mode information, at regular intervals or irregular intervals.

According to this feature, when any one of the electronic keys is shifted to the deactivated mode, the signal containing the deactivated mode information is transmitted at regular intervals or irregular intervals. This makes it possible to increase a possibility of shifting the remaining electronic key(s) to the deactivated mode.

Preferably, in the electronic key system of the present invention, the vehicle-mounted device is configured to be shifted to the deactivated mode in response to receiving of the signal containing the deactivated mode information, and, when operating in the deactivated mode, to transmit a given signal containing the deactivated mode information.

According to this feature, when the vehicle-mounted device receives the signal containing the deactivated mode information, from any one of the electronic keys, the deactivated mode information is added to a given signal to be transmitted from the vehicle-mounted device. Thus, in the electronic key system of the present invention, it becomes possible to transmit the deactivated mode information from any one of the electronic keys shifted to the deactivated mode to the remaining electronic key(s) via the vehicle-mounted device to thereby shift the remaining electronic key(s) to the deactivated mode.

Preferably, in the electronic key system of the present invention, each of the plurality of electronic keys comprises a mode shift manipulation section, and are configured to be shifted to the deactivated mode in response to manipulation of the mode shift manipulation section thereof.

According to this feature, by manipulating the mode shift manipulation section in each of the plurality of electronic keys, a user can shift the electronic key to the deactivated mode.

Effect of Invention

The electronic key system of the present invention can allow a relay attack countermeasure to reliably work even in the situation where there are a plurality of electronic keys for one vehicle.

DESCRIPTION OF EMBODIMENTS

With reference to the accompanying drawings, the present invention will now be described based on one embodiment thereof.

Figure 1:
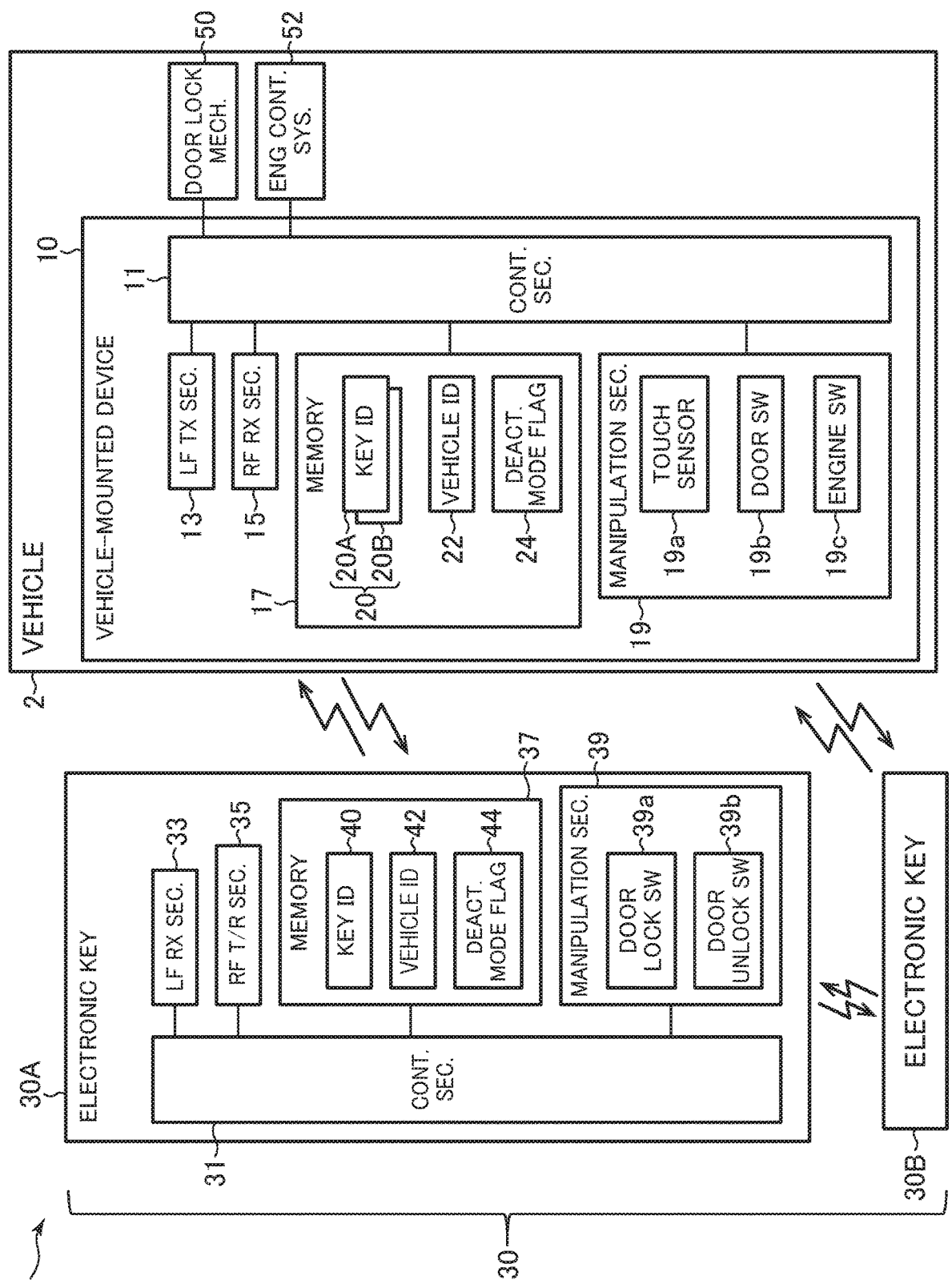
FIG. 1 is a block diagram depicting an electronic key system according to one embodiment of the present invention.

First of all, a configuration of an electronic key system according to one embodiment of the present invention will be described with reference to FIG. 1. FIG. 1 is a block diagram depicting the electronic key system.

As depicted in FIG. 1, the electronic key system 1 according to this embodiment comprises a vehicle-mounted device 10 mounted to a vehicle 2, and electronic keys 30 (30A, 30B) capable of being carried by a user. In the electronic key system 1, based on a smart keyless function, a user who carries the electronic key 30 can cause a given processing to be executed in the vehicle 2, simply by performing a given manipulation. Specifically, the user can automatically unlock a door lock mechanism simply by putting his/her hand on a door knob of the vehicle 2 so as to open the door and then automatically lock the door lock mechanism simply by pushing down a door switch provided on the vehicle 2 when closing the door, and can start an engine simply by pushing down an engine switch.

Each of the components of the electronic key system 1 is configured to selectively operate in either one of a normal mode, i.e., a state in which the smart keyless function is effectively enabled, and a deactivated mode, i.e., a state in which the smart keyless function is temporarily deactivated.

The vehicle-mounted device 10 comprises a control section 11, a low frequency (LF) transmitting section 13, a radio frequency (RF) receiving section 15, memory 17, and a manipulation section 19.

The control section 11 is composed of a CPU, etc., and configured to output control signals (door lock and door unlock instruction signals, engine start instruction signal) to a door lock mechanism 50 and an engine control system 52 of the vehicle 2, based on processing for communication with the electronic keys 30.

The LF transmitting section 13 comprises a transmitter and a transmitting antenna, and is configured to transmit a LF signal to the electronic keys 30, based on an instruction of the control section 11. A communicable distance in communication by the LF signal is set to be relatively short, i.e., set such that the communication can be established only when the user is located around or inside the vehicle 2. For example, it is set to about 1 m.

The RF receiving section 15 comprises a receiver and a receiving antenna, and is configured to output a RF signal received from the electronic key 30, to the control section 11. A communicable distance in communication by the RF signal is set to be longer than that of the LF signal. For example, it is set to several tens of meters to about 100 m.

The memory 17 stores therein applications and necessary data for the control section 11. The data stored in the memory 17 includes key IDs 20, a vehicle ID 22, and a deactivated mode flag 24. The key IDs 20 (20A, 20B) are ID information unique to respective one of the plurality of the electronic keys 30 (30A, 30B), respectively, dedicated to the vehicle 2 (i.e., vehicle-mounted device 10). The vehicle ID 22 is ID information unique to the vehicle 2. The deactivated mode flag 24 is set to ON when the execution of the smart keyless function is being temporarily deactivated (in the deactivated mode), and set to OFF when the execution of the smart keyless function is being enabled (in the normal mode).

The manipulation section 19 includes a touch sensor 19a, a door switch 19b, and an engine switch 19c. The touch sensor 19a is provided on the door knob of the vehicle 2, and disposed such that a hand of the user touches it when he/she puts the hand on the door knob so as to open the door. The touch sensor 19a is configured to output a detection signal (manipulation signal) in response to a touch or approach of a hand of the user. The door switch 19b is provided on the vehicle 2, such that the user can push down it when closing the door. The door switch 19b is configured to output a manipulation signal when it is pushed down. The engine switch 19c is provided in a vehicle interior, such that the user can push down it when starting the engine. The engine switch 19c is configured to output a manipulation signal when it is pushed down.

The door lock mechanism 50 is provided in each door of the vehicle 2, and configured to lock and unlock the corresponding door in response to receiving of the door lock instruction signal and the door unlock instruction signal from the vehicle-mounted device 10.

The engine control system 52 comprises a control unit for controlling the engine of the vehicle 2, and is configured to start the engine in response to receiving of the engine start instruction signal from the vehicle-mounted device 10.

In this embodiment, the electronic keys 30 include the electronic keys 30A, 30B. It should be noted that the number of the electronic keys may be 3 or more. Each of the electronic keys 30 comprises a control section 31, a LF receiving section 33, a RF receiving-transmitting section 35, a memory 37, and a manipulation section 39. It should be noted that a combination of the vehicle-mounted device 10 and the electronic key(s) 30 functions as a remote entry system, in addition to the electronic key system. Thus, the electronic keys 30 are also used as a remote controller for a remote entry function.

The control section 31 is composed of a CPU, etc., and configured to execute various processing such as processing for communication with the vehicle-mounted device 10 and the other electronic key(s) 30, processing for temporarily deactivating the smart keyless function based on a given manipulation of the manipulation section 39, and processing for recovering from the temporary deactivation.

The LF receiving section 33 comprises a receiver and a receiving antenna, and is configured to output a LF signal received from the vehicle-mounted device 10 to the control section 31.

The RF receiving-transmitting section 35 comprises a transceiver and a transmitting-receiving antenna, and is configured to transmit a RF signal to the vehicle-mounted device 10 based on an instruction of the control section 31. The RF receiving-transmitting section 35 is also configured to transmit and receive a RF signal with respect to the other electronic key(s) 30.

The memory 37 stores therein applications and necessary data for the control section 31. The data stored in the memory 37 includes a key ID 40, a vehicle ID 42, and a deactivated mode flag 44. The key ID 40 is ID information unique to each of the electronic keys 30. The vehicle ID 42 is ID information unique to the vehicle 2. The deactivated mode flag 44 is set to ON when the execution of the smart keyless function is being temporarily deactivated (in the deactivated mode), and set to OFF when the execution of the smart keyless function is being enabled (in the normal mode).

The manipulation section 39 includes a door lock switch 39a, and a door unlock switch 39b. In the electronic key system 1, the user can temporarily deactivate the smart keyless function (i.e., can shift the operation mode to the deactivated mode) by performing a specific deactivation manipulation, using the door lock switch 39a (e.g., pushing down the door lock switch 39a continuously for 2 seconds or plural times). Further, the user can recover the smart keyless function from the temporarily deactivated state to an activated state (i.e. can shift the operation mode to the normal mode) by performing a specific manipulation, using the door unlock switch 39b (e.g., pushing down the door unlock switch 39b continuously for 2 seconds or plural times). The manipulation section 39 is one example of a "mode shift manipulation section."

On the other hand, when the electronic key system 1 functions as the remote entry system, the user can unlock and lock the door of the vehicle 2 by manipulating the manipulation section 39 of the electronic key 30. Specifically, when the user pushes down the door lock switch 39a or the door unlock switch 39b, an RF signal (a door lock signal or a door unlock signal) is output from the electronic key 30, and the vehicle-mounted device 10 receiving the RF signal instructs the door lock mechanism 50 to lock or unlock the door.

As above, in this embodiment, the door lock switch 39a and the door unlock switch 39b are used, respectively, for the temporal deactivation and the recovering of the smart keyless function. Alternatively, dedicated switches may be provided instead of the switches 39a, 39b. Further, each of the vehicle-mounted device 10 and the electronic key 30 may comprise an indicating section (e.g., light emitting diodes (LEDs)) for indicating a currently operating control mode (i.e., normal mode or deactivated mode).

Figure 2:
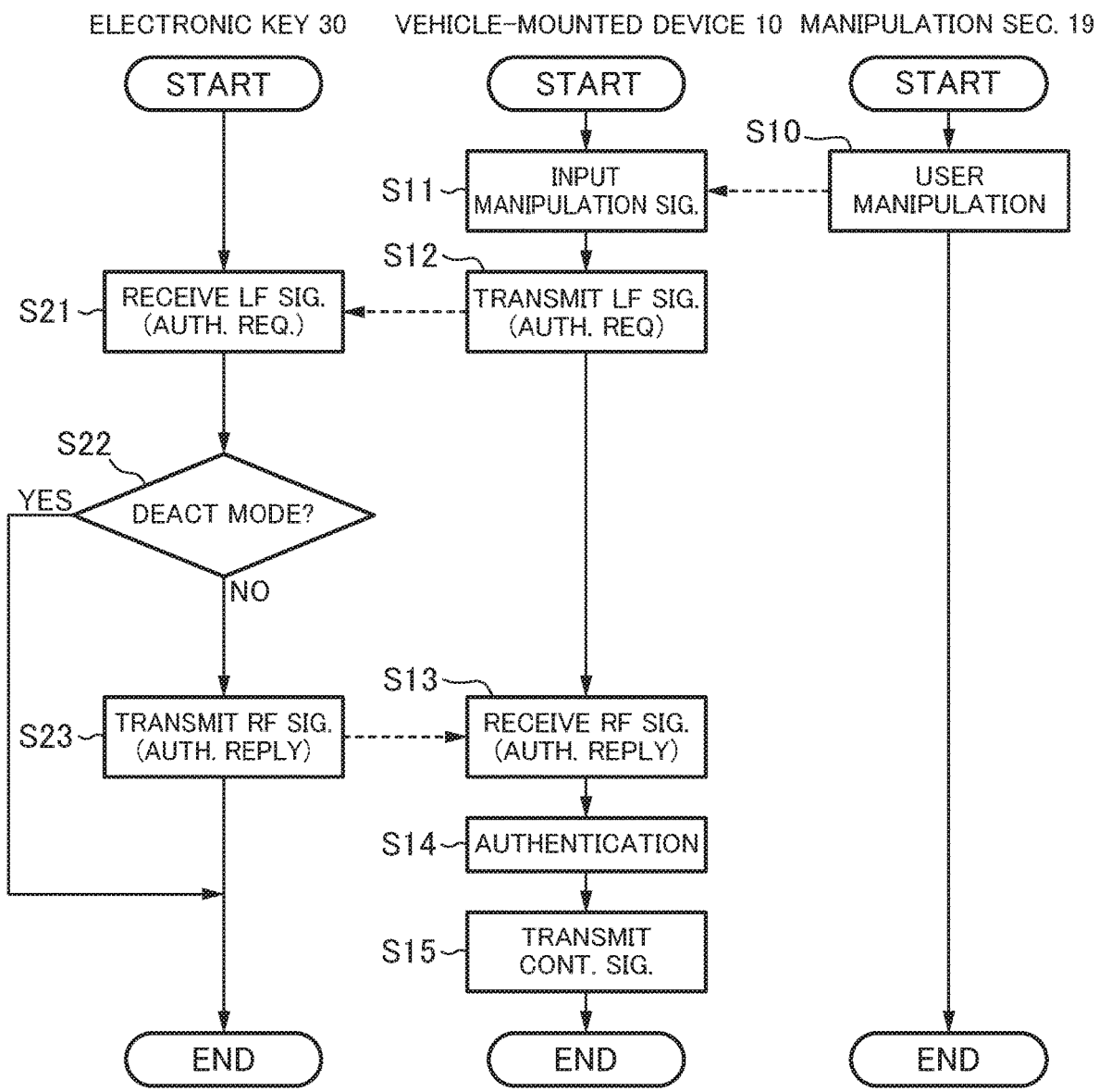
FIG. 2 is an explanatory diagram depicting a basic processing flow of a smart keyless function in the electronic key system according to this embodiment.

Next, with reference to FIG. 2, an outline of the smart keyless function in the electronic key system according to this embodiment will be described. FIG. 2 is an explanatory diagram depicting a basic processing flow of the smart keyless function. The following description will be made on the assumption that the electronic keys 30 and the vehicle-mounted device 10 in FIG. 2 are initially operating in either one of the normal mode or the deactivated mode.

First, when a user who carries the electronic key 30 manipulates one of the sensor and switches of the manipulation section 19 provided in the vehicle 2 (S10), the control section 11 of the vehicle-mounted device 10 receives a manipulation signal corresponding to the manipulated sensor or switch of the manipulation section 19 (S11). Based on the received manipulation signal, the control section 11 transmits a LF signal (S12). This LF signal is an authentication request signal which contains the vehicle ID 22.

In the electronic key 30, the control section 31 receives the LF signal via the LF receiving section 33 (S21). Upon receiving the LF signal, the control section 31 determines whether or not the electronic key 30 is in the deactivated mode (whether the deactivated mode flag 44 is in the ON state or in the OFF state) (S22). When the electronic key 30 is determined to be in the deactivated mode (S22; YES), this processing routine is terminated. On the other hand, when the electronic key 30 is determined to be not in the deactivated mode (S22; NO, i.e., in the normal mode), the control section 31 transmits an RF signal via the RF transmitting-receiving section 35 (S23), and then terminates this processing routine. This RF signal is an authentication reply signal which contains the vehicle ID 42, and the key ID 40 of the electronic key 30.

The control section 31 may be configured to execute processing for authentication of the LF signal when the electronic key 30 receives the LF signal. This authentication processing may comprise performing a cross-check between the vehicle ID 22 contained in the LF signal and the vehicle ID 42 stored in the memory 37. In this case, when the two vehicle IDs are coincident with each other, the control section 31 executes the above processing (S22, S23). On the other hand, when the two vehicle IDs are not coincident with each other, the control section 31 terminates this processing routine in disregard of the received LF signal.

In the vehicle-mounted device 10, when the control section 11 receives, via the RF receiving section 15, the RF signal returned by the electronic key 30, within a given time period from the transmitting of the LF signal (S13), the control section 11 performs processing for authentication of the received RF signal (S14). Specifically, the control section 11 performs a cross-check between corresponding ones of the vehicle ID 42 and the key ID 40 contained in the RF signal, and the vehicle ID 22 and the key ID 20 stored in the memory 17. On the other hand, when the control section 11 does not receive the RF signal within the given time period from the transmitting of the LF signal, the control section 11 terminates this processing routine.

In this authentication processing, when the vehicle ID 42 and the key ID 40 are coincident, respectively, with the vehicle ID 22 and the key ID 20 (success in authentication), this means that the vehicle-mounted device 10 receives the RF signal from an electronic key 30 corresponding to the device 10. Thus, the control section 11 transmits a given control signal (S15) and then terminates this processing routine. On the other hand, when the IDs 42, 40 are not coincident, respectively, with the IDs 22, 20 (failure in authentication), this means that the RF signal received by the vehicle-mounted device 10 is transmitted from an electronic key other than the electronic key 30 associated with the vehicle 2, the control section 11 terminates this processing routine in disregard of the received RF signal.

The vehicle-mounted device 10 is capable of receiving RF signals from both of the electronic keys 30A, 30B corresponding to the device 10. For this reason, in the cross-check regarding key IDs, the control section 11 determines whether or not either one of the key IDs 20A, 20B stored in the memory 17 is coincident with the key ID 40 contained in the RF signal.

In the case where the touch sensor 19a is manipulated, the door unlock instruction signal is output as the given control signal to the door lock mechanism 50, and, in the case where the door switch 19b is manipulated, the door lock instruction signal is output as the given control signal to the door lock mechanism 50. Further, in the case where the engine switch 19c is manipulated, the engine start instruction signal is output as the given control signal to the engine control system 52.

As above, in a situation where the electronic key system 1 operates in the normal mode in which the smart keyless function is enabled, a user who carries the electronic key 30 can cause the given processing to be executed in the vehicle 2, by performing the given manipulation. More specifically, in the normal mode, the given wireless communication processing including transmitting the authentication request signal and return of the authentication reply signal between the vehicle-mounted device 10 and the electronic key 30 (S12 to S14, S21 to S23) is executed, and if this wireless communication is successfully completed, the given processing will be automatically executed.

On the other hand, when the electronic key system 1 operates in the deactivated mode, the smart keyless function is disabled. Specifically, in this embodiment, the electronic key 30 in the deactivated mode does not transmit any RF signal even when receiving a LF signal. Therefore, the vehicle-mounted device 10 cannot execute the processing in the steps S13 to S15, so that the given processing is not executed. Thus, by shifting the operation mode to the deactivated mode, a user can prevent the door of the vehicle 2 from being unlocked by the relay attack.

In the example depicted in FIG. 2, the electronic key 30 is configured to be inhibited in the deactivated mode from returning a RF signal so as to temporarily disable the smart keyless function. Alternatively, the electronic key 30 may be configured to return, in the deactivated mode, a RF signal containing deactivated mode information indicating that the electronic key 30 is operating in the deactivated mode. In this case, the vehicle-mounted device 10 is configured to execute processing for determination of whether or not the deactivated mode information is contained in the RF signal, and, when the deactivated mode information is determined to be contained, omit execution of at least the step S15.

In the deactivated mode, even a user who carries the electronic key 30 cannot unlock the door, even by manipulating the manipulation section 19 (touch sensor 19a). In this case, however, the user can unlock the door through the use of the conventional remote entry function, i.e., by manipulating the door unlock switch 39b of the electronic key 30.

Figure 3:
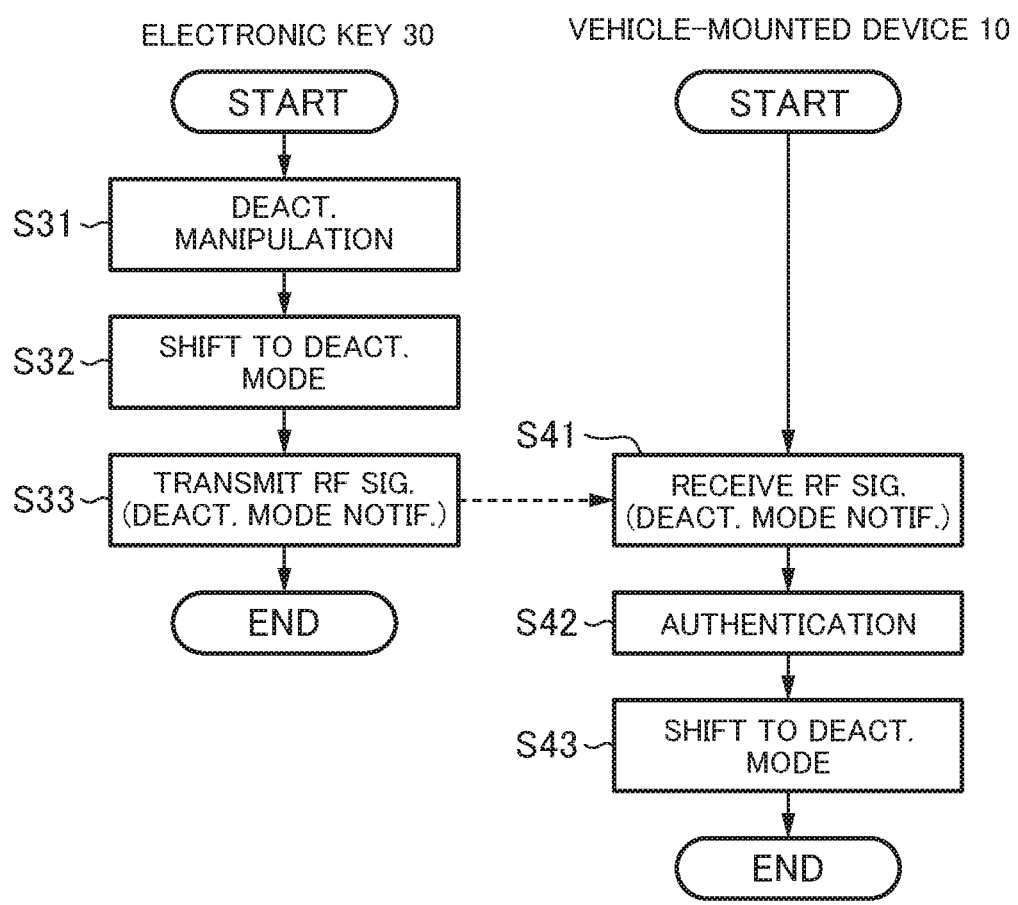
FIG. 3 is an explanatory diagram depicting a flow of a processing for deactivating the smart keyless function in the electronic key system according to this embodiment.

Next, with reference to FIG. 3, the processing for temporarily deactivating the smart keyless function (disabling processing) in the electronic key system according to this embodiment will be described. FIG. 3 is an explanatory diagram depicting a flow of the processing for deactivating the smart keyless function. The following description will be made on the assumption that the electronic key 30 and the vehicle-mounted device 10 in FIG. 3 are operating in the normal mode before start of this processing routine.

For a relay attack countermeasure or the like, the user can temporarily disable the smart keyless function based on his/her own will. First, in the electronic key 30, when the user performs a deactivation manipulation by using the manipulation section 39, the control section 31 receives the deactivation manipulation signal sent from the manipulation section 39 (S31) and then sets the deactivated mode flag 44 to the ON state to shift the electronic key 30 to the deactivated mode (S32).

Subsequently, the control section 31 transmits a deactivated mode notification signal via the RF receiving-transmitting section 35 (S33). The deactivated mode notification signal contains the vehicle ID 42, the key ID 40, and the deactivated mode information. The deactivated mode information indicates that the electronic key 30 is operating in the deactivated mode.

Upon receiving the RF signal (deactivated mode notification signal) transmitted from the electronic key 30 (S41), the vehicle-mounted device 10 executes processing for authentication of the received RF signal (S42). This authentication processing is the same as that in the step S14 depicted in FIG. 2, i.e., the control section 11 performs a cross-check between corresponding ones of the vehicle ID 42 and the key ID 40 contained in the RF signal, and the vehicle ID 22 and the key ID 20 stored in the memory 17.

When the authentication has been successively completed, the control section 11 determines whether or not the deactivated mode information is contained in the RF signal. In this example, the deactivated mode information is contained in the RF signal, so that the control section 11 sets the deactivated mode flag 24 in the memory 17 to the ON state (S43; shift to the deactivated mode), and then terminates this processing routine. As above, in this embodiment, by performing the deactivation manipulation, using the electronic key 30, a user can shift the electronic key 30 and the vehicle-mounted device 10 from the normal mode to the deactivated mode.

Further, in this embodiment, by performing the recovering manipulation, using the electronic key 30 by a user, the control section 31 in the electronic key 30 sets the deactivated mode flag 44 to the OFF state to shift the electronic key 30 to the normal mode, and transmits, to the vehicle-mounted device 10, a normal mode notification signal containing normal mode information indicating that the electronic key 30 is operating in the normal mode. Then, upon receiving the normal mode notification signal, after the authentication processing, the vehicle-mounted device 10 sets the deactivated mode flag 24 to the OFF state to shift the vehicle-mounted device 10 to the normal mode, based on the fact that the normal mode information is contained in the received signal.

Figure 4:
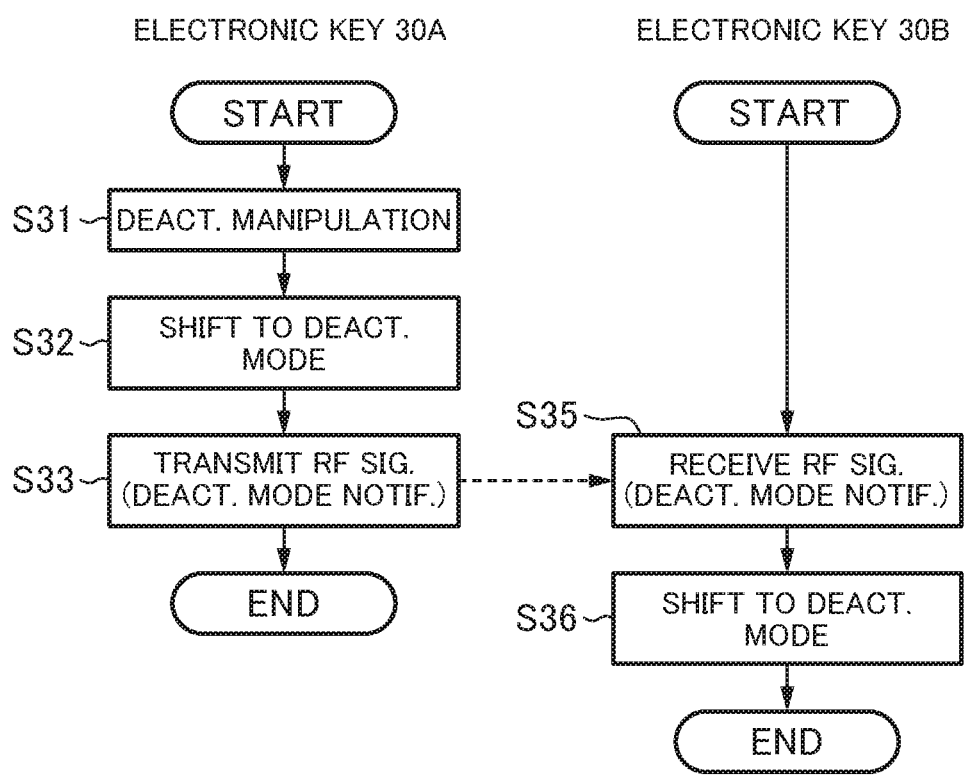
FIG. 4 is an explanatory diagram depicting a flow of a first deactivated mode-sharing processing in the electronic key system according to this embodiment.
Figure 5:
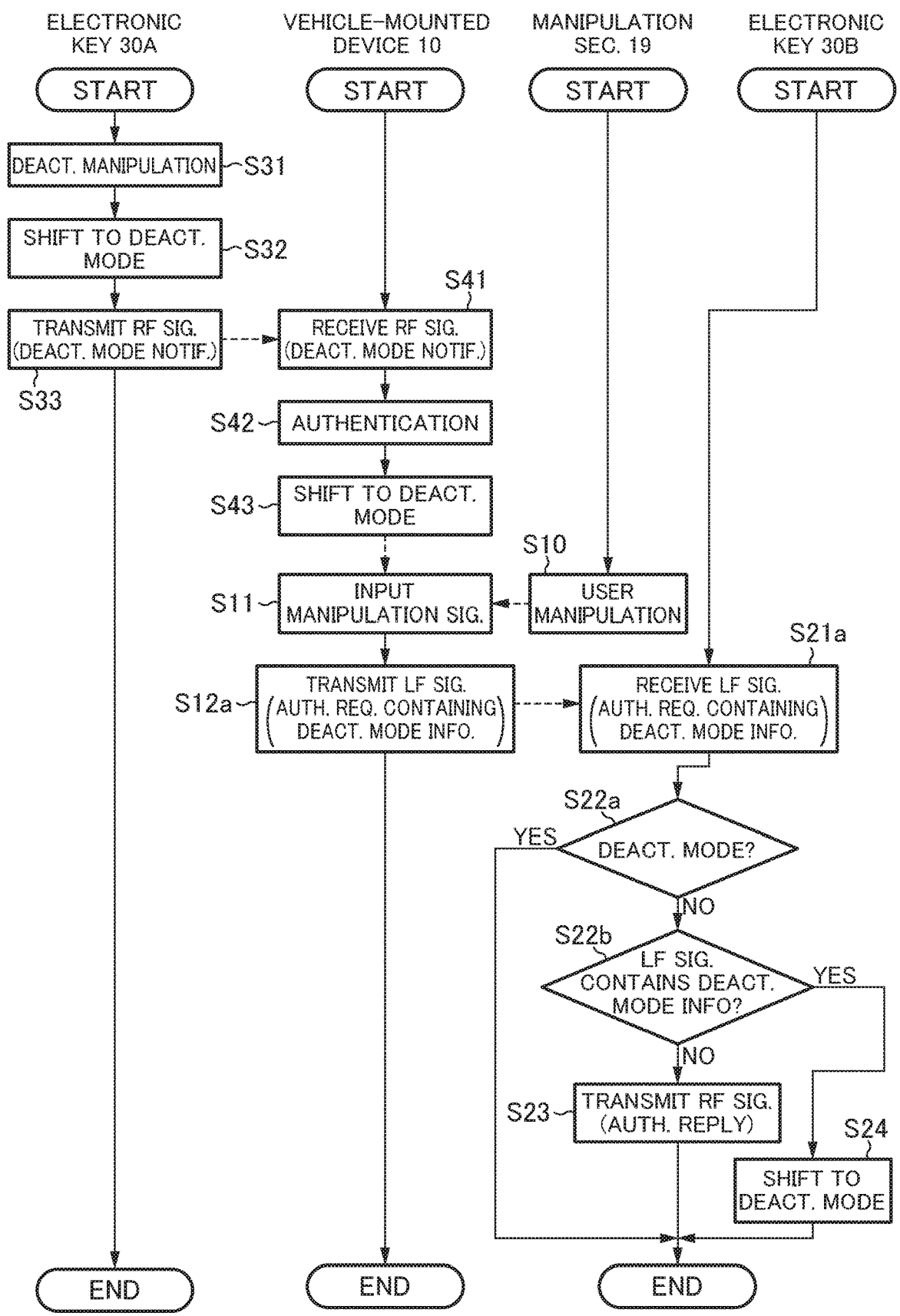
FIG. 5 is an explanatory diagram depicting a flow of a second deactivated mode-sharing processing in the electronic key system according to this embodiment.

Next, with reference to FIG. 4 and FIG. 5, the deactivated mode-sharing processing in the electronic key system according to this embodiment will be described. FIG. 4 is an explanatory diagram depicting a flow of a first deactivated mode-sharing processing, and FIG. 5 is an explanatory diagram depicting a flow of a second deactivated mode-sharing processing.

By the deactivation manipulation, the electronic keys 30A, 30B are shifted to the deactivated mode, individually. Thus, there can be a situation where, even when the first electronic key 30A is operating in the deactivated mode, the second electronic key 30B is operating in the normal mode.

As can be seen from FIG. 2, in this situation, when the second electronic key 30B is used in combination with the vehicle-mounted device 10, the door of the vehicle 2 is likely to be unlocked by the relay attack. Specifically, the electronic key 30B is not in the deactivated mode (S22; NO), so that the RF signal is transmitted (S23). Then, in the vehicle-mounted device 10, the RF signal (S13) is received, and, because the authentication is successfully completed (S14), the given control signal is transmitted (S15).

For this reason, in this embodiment, the deactivated mode-sharing processing is executed such that, when a certain one of a plurality of electronic keys 30 enters the deactivated mode, the remaining electronic key(s) 30 is also shifted to the deactivated mode. In this embodiment, each of the electronic keys 30 is configured to be shifted from the normal mode to the deactivated mode, when it receives some kind of proper signal containing the deactivated mode information, from the remaining electronic key(s) or the vehicle-mounted device 10.

FIG. 4 depicts the first deactivated mode-sharing processing to be executed directly among the plurality of electronic keys. In this processing routine, due to the deactivation manipulation in the electronic key 30A, the electronic key 30B is shifted to the deactivated mode, in the same manner as the vehicle-mounted device 10 is shifted to the deactivated mode in the processing routine presented in FIG. 3. In FIG. 4, the same processing as that in FIG. 3 is assigned with the same processing number. Further, the following description will be made on the assumption that the electronic keys 30A, 30B in FIG. 4 are operating in the normal mode before the start of this processing routine.

As depicted in FIG. 4, when a user performs the deactivation manipulation by using the manipulation section 39 in the electronic key 30A, the control section 31 receives the deactivation manipulation signal (S31) and sets the deactivated mode flag 44 to the ON state to shift the electronic key 30A to the deactivated mode (S32). Subsequently, the control section 31 transmits the deactivated mode notification signal via the RF receiving-transmitting section 35 (S33).

In a situation where the second electronic key 30B is located within the communicable distance in communication by the RF signal with respect to the first electronic key 30A, the second electronic key 30B receives the deactivated mode notification signal transmitted from the first electronic key 30A (S35). In the electronic key 30B, upon receiving the deactivated mode notification signal via the RF receiving-transmitting section 35, the control section 31 sets the deactivated mode flag 44 to the ON state to shift the electronic key 30B to the deactivated mode (S36), because the received signal contains the deactivated mode information, and then terminates this processing routine. The processing routine in FIG. 4 is executable concurrently with the processing routine in FIG. 3.

The electronic key 30B in FIG. 4 may be configured to execute processing for authentication of the deactivated mode notification signal received from the electronic key 30A. This authentication processing comprises cross-checking whether the vehicle ID contained in the received deactivated mode notification signal is coincident with the vehicle ID stored in the memory of the electronic key 30B. When these vehicle IDs are coincident with each other (success in authentication), the above processing is executed (S36). On the other hand, when these vehicle IDs are not coincident with each other (failure in authentication), this processing routine is terminated.

Further, the electronic key 30B in FIG. 4 may be configured such that, after receiving the deactivated mode notification signal, the control section 31 thereof determines whether or not the electronic key 30B is operating in the deactivated mode. In this determination processing, when the electronic key 30B is determined to be operating in the deactivated mode, this processing routine is terminated. On the other hand, when the electronic key 30B is determined to be not operating in the deactivated mode, the control section 31 executes the above processing (S36).

As above, in the processing routine presented in FIG. 4, the deactivated mode information can be transmitted and received among the plurality of electronic keys 30 by using the deactivated mode notification signal of the electronic keys 30. In this way, when a certain one of the plurality of electronic keys is shifted to the deactivated mode, the corresponding electronic key(s) located around the certain electronic key can be automatically shifted to the deactivated mode. For example, when a user returns to his/her house by driving the vehicle 2 with the electronic key 30A, the user can perform the deactivation manipulation by using the electronic key 30A, to shift the electronic key 30A to the deactivated mode, as well as the second electronic key 30B existing within his/her house.

In the example depicted in FIG. 4, the electronic key 30A is configured to transmit the deactivated mode notification signal only when the deactivation manipulation is performed. Alternatively, the electronic key 30 may be configured such that, when it enters the deactivated mode once, the control section 31 transmits the deactivated mode notification signal at regular intervals (e.g., every 1 hour) or irregular intervals, via the RF receiving-transmitting section 35.

FIG. 5 depicts second deactivated mode-sharing processing to be executed among the plurality of electronic keys through the vehicle-mounted device 10. In FIG. 5, the same processing as that in FIG. 2 or FIG. 3 is assigned with the same processing number. Further, the following description will be made on the assumption that the electronic keys 30A, 30B in FIG. 5 are operating in the normal mode before start of this processing routine.

Steps S31 to S33 and steps S41 to S43 in FIG. 5 are the same as those in FIG. 3. Specifically, when a user performs the deactivation manipulation by using the electronic key 30A, the electronic key 30A receives the deactivation manipulation signal from the manipulation section 39 (S31), switches to the deactivated mode (S32), and transmits the deactivated mode notification signal containing the deactivated mode information (S33). The vehicle-mounted device 10 receives the deactivated mode notification signal (S41), executes the authentication processing (S42), and switches to the deactivated mode (S43).

Steps S10 and S11 in FIG. 5 are the same as those in FIG. 2. Specifically, when a user manipulates the manipulation section 19 (S10), the vehicle-mounted device 10 receives a manipulation signal (S11). Upon receiving the manipulation signal, the vehicle-mounted device 10 transmits a LF signal (authentication request signal) (S12a), in the same manner as that in the step S12 depicted in FIG. 2.

At this point, the vehicle-mounted device 10 has received the deactivated mode notification signal containing the deactivated mode information (S41), and thereby has been shifted to the deactivated mode (S43). Therefore, in the step S12a, the control section 11 of the vehicle-mounted device 10 transmits the LF signal containing the deactivated mode information.

The following processing flow for the electronic key 30B in FIG. 5 is presented as a processing flow including the step of determining whether or not the electronic key 30B is operating in the deactivated mode and the step of determining whether or not the deactivation mode information is contained in the LF signal, based on the processing flow for the electronic key in FIG. 2.

In a situation where the electronic key 30A is not located within the communicable distance in communication by the LF signal, but the electronic key 30B is located within the communicable distance in communication by the LF signal, only the electronic key 30B receives the LF signal (S21a), in the same manner as that in the step S21 depicted in FIG. 2. Upon receiving the LF signal containing the deactivation mode information, the electronic key 30B determines whether or not the electronic key 30B is operating in the deactivated mode (S22a), in the same manner as that in the step S22 depicted in FIG. 2. In the processing flow, the authentication processing may be additionally executed, in the same manner as previously mentioned.

When the electronic key 30B is determined to be already operating in the deactivated mode (S22a; YES), this processing routine is terminated. Thus, irrespective of the manipulation of the manipulation section 19 by the user, the given processing based on the smart keyless function is not executed in the vehicle 2. On the other hand, when the electronic key 30B is determined to be not operating in the deactivated mode (S22a; NO), the control section 31 of the electronic key 30B determines whether or not the deactivation mode information is contained in the received LF signal (S22b).

When the deactivation mode information is determined to be contained in the received LF signal (S22b; YES), since the electronic key 30B being operating in the normal mode receives the deactivation mode information, it is shifted to the deactivation mode, based on this information (S24), then it terminates this processing routine.

In this way, the deactivation mode information is transmitted from the electronic key 30A to the vehicle-mounted device 10, and, in response to manipulation of the manipulation section 19 by a user, further transmitted from the vehicle-mounted device 10 to the electronic key 30B. Then, the electronic key 30B receiving the deactivation mode information can be shifted to the deactivation mode. In this case, no authentication reply signal is returned from the electronic key 30B. Thus, the given processing based on the smart keyless function is not executed.

On the other hand, when the deactivation mode information is determined to be not contained in the received LF signal (S22b; NO), the electronic key 30B being operating in the normal mode returns the RF signal (authentication reply signal) toward the vehicle-mounted device 10 (S23), in the same manner as that in the step S23 depicted in FIG. 2. In this way, as a reply to the authentication request signal transmitted from the vehicle-mounted device 10 in response to manipulation of the manipulation section 19 by a user, the authentication reply signal is returned from the electronic key 30B. Thus, the given processing based on the smart keyless function is executed in the vehicle 2.

As above, in the processing routine presented in FIG. 5, by transmitting the deactivation mode information, using the deactivation mode notification signal from the electronic key 30 and the authentication request signal from the vehicle-mounted device 10, the deactivation mode information can be transmitted from the first electronic key 30A to the second electronic key 30B via the vehicle-mounted device 10. Thus, upon shifting a certain one of the plurality of electronic keys to the deactivated mode, the other electronic key(s) can also be shifted to the deactivated mode.

Last of all, functions/advantageous effects of the electronic key system 1 according to this embodiment will be described.

The electronic key system 1 according to this embodiment has the normal mode in which the smart keyless function is permitted to be executed, and the deactivated mode in which the smart keyless function is deactivated. When a certain electronic key 30A of the plurality of electronic keys (30A, 30B) is operating in the deactivated mode, the certain electronic key 30A transmits the signal containing the deactivated mode information (deactivation mode notification signal), at a given time. Then, the other electronic key 30B receiving the deactivated mode information directly or indirectly can be shifted to the deactivated mode. According to this feature, when a certain one of the plurality of electronic keys is shifted to the deactivated mode, the remaining electronic key(s) can also be shifted to the deactivated mode. Thus, it becomes possible to allow a relay attack countermeasure to automatically effectively work for the remaining electronic key(s), as well as the certain electronic key.

In this embodiment, at least one of the plurality of electronic keys 30A, 30B comprises the manipulation section 39 (door lock switch 39a) for causing a shift from the normal mode to the deactivated mode, wherein the at least one electronic key 30 is configured to be shifted to the deactivated mode in response to manipulation of the manipulation section 39, and to transmit the deactivation mode notification signal containing the deactivated mode information. Thus, in this embodiment, by manipulating the manipulation section 39 of the at least one electronic key 30, the user can shift the electronic key 30 to the deactivated mode, based on the user's own will. Further, in this embodiment, the deactivation mode notification signal containing the deactivated mode information is transmitted from the certain electronic key 30, in response to manipulation of the manipulation section 39 of the certain electronic key 30. This makes it possible to shift the remaining electronic key(s) 30 to the deactivated mode at the same timing.

In this embodiment, the certain electronic key 30 being operating in the deactivated mode is configured to transmit the deactivation mode notification signal containing the deactivated mode information, at regular intervals or irregular intervals. According to this feature, when the certain electronic key 30 is shifted to the deactivated mode, the deactivation mode notification signal containing the deactivated mode information is transmitted at regular intervals or irregular intervals. This makes it possible to increase a possibility of shifting the remaining electronic key(s) to the deactivated mode.

In this embodiment, the vehicle-mounted device 10 is configured to set the deactivation mode flag 24 to the ON state in response to receiving of the signal containing the deactivated mode information (deactivation mode notification signal), and, when the deactivation mode flag 24 is in the ON state, to transmit a given signal (authentication request signal) containing the deactivated mode information. According to this feature, it becomes possible to transmit the deactivated mode information from the certain electronic key 30 shifted to the deactivated mode to the remaining electronic key(s) 30 via the vehicle-mounted device 10 to thereby shift the remaining electronic key(s) 30 to the deactivated mode.

In this embodiment, each of the plurality of electronic keys 30A, 30B comprises the manipulation section 39 (door lock switch 39*a*), and configured to be shifted to the deactivated mode in response to manipulation of the manipulation section 39 thereof. According to this feature, by manipulating the manipulation section 39 in each of the plurality of electronic keys 30, a user can shift the electronic key 30 to the deactivated mode.

LIST OF REFERENCE CHARACTERS

1: electronic key system
2: vehicle
10: vehicle-mounted device
30, 30A, 30B: electronic key
50: door lock mechanism
52: engine control system

The invention claimed is:

1. An electronic key system comprising:
a vehicle-mounted device mounted to a vehicle; and
a plurality of electronic keys each wirelessly communicable with the vehicle-mounted device,
wherein the electronic key system is configured to have:
a normal mode in which a given processing is permitted to be executed by the vehicle-mounted device when a given wireless communication processing between the vehicle-mounted device and any one of the plurality of electronic keys is successfully completed; and
a deactivated mode in which the given processing is inhibited from being executed by the vehicle-mounted device,
wherein each of the plurality of electronic keys is configured, when operating in the deactivated mode, to transmit, at a given time, a signal containing deactivated mode information indicating that a corresponding electronic key is operating in the deactivated mode, and
wherein each of the plurality of electronic keys is configured, when operating in the normal mode, to be shifted to the deactivated mode in response to receiving of the signal containing the deactivated mode information so as to transmit, at the given time, the signal containing the deactivated mode information.

2. The electronic key system as recited in claim 1, wherein at least one of the plurality of electronic keys comprises a mode shift manipulation section for causing a shift from the normal mode to the deactivated mode, the at least one electronic key configured to be shifted to the deactivated mode and to transmit the signal containing the deactivated mode information, in response to manipulation of the mode shift manipulation section.

3. The electronic key system as recited in claim 1, wherein each of the plurality of electronic keys is configured, in the deactivated mode, to transmit the signal containing the deactivated mode information, at regular intervals or irregular intervals.

4. The electronic key system as recited in claim 1, wherein the vehicle-mounted device is configured to be shifted to the deactivated mode in response to receiving of the signal containing the deactivated mode information, and, when operating in the deactivated mode, to transmit a given signal containing the deactivated mode information.

5. The electronic key system as recited in claim 2, wherein each of the plurality of electronic keys comprises the mode shift manipulation section, and is configured to be shifted to the deactivated mode in response to manipulation of the mode shift manipulation section.

6. The electronic key system as recited in claim 1, wherein each of the plurality of electronic keys is configured to be shifted to the deactivated mode in response to receiving the signal containing the deactivated mode information from one of the plurality of electronic keys.

\* \* \* \* \*